G. Schwarzwalder.
Vermicelli Cutter.

Nº 91,971. Patented Jan. 29, 1869.

Witnesses:
Francis Clark
Conrad Schleyer

Inventor:
Gottl. Schwarzwalder

United States Patent Office.

GOTTLIED SCHWARZWALDER, OF PITTSBURG, PENNSYLVANIA.

Letters Patent No. 91,971, dated June 29, 1869.

IMPROVED MACHINE FOR CUTTING VERMICELLI.

The Schedule referred to in these Letters Patent and making part of the same.

*To all whom it may concern:*

Be it known that I, GOTTLIED SCHWARZWALDER, of the city of Pittsburg, in the county of Allegheny, and State of Pennsylvania, have invented a new Machine for Cutting Vermicelli; and I do hereby declare that the following is a full, clear, and exact description thereof, reference being had to the accompanying drawings, and to the letters of reference marked thereon, in which—

Figure 1:
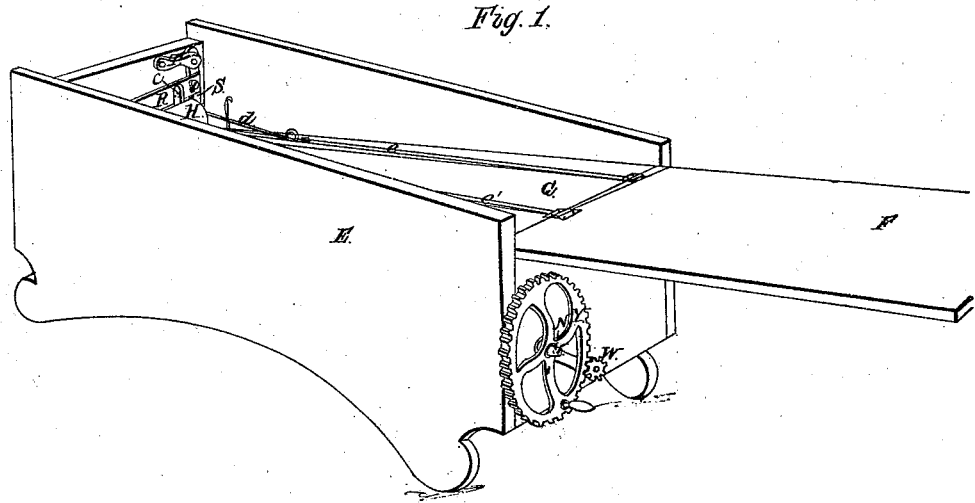
Figure 2:
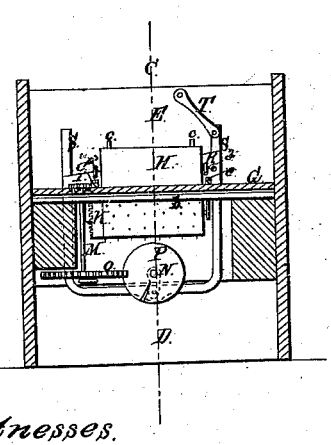
Figure 3:
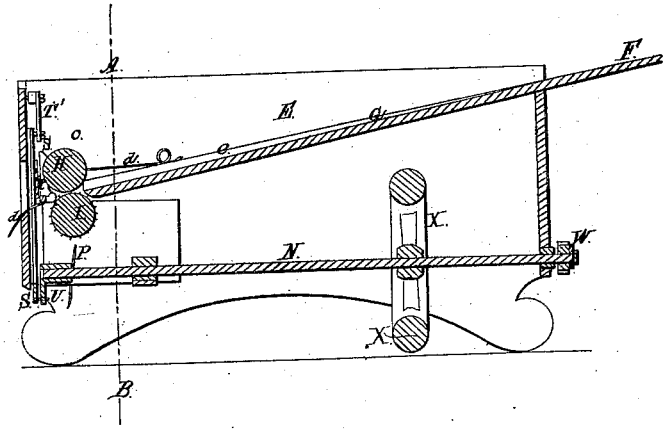

Figure 1 is a perspective view;

Figure 2, a cross-section through the section-line A B of fig. 3; and

Figure 3, a vertical central-section through the section-line C D of fig. 2.

My invention consists of a machine, constructed as hereinafter described, for cutting the dough from which vermicelli is made into narrow strips, preparatory to drying.

To enable others skilled in the art to make and use my invention, I will proceed to describe its construction and operation.

My machine consists of the wooden box E, having the cover F hinged, as shown, and which, when turned back, forms a table, on which the dough is placed, and a continuation of the inclined bottom-board G, in the box E.

At the lower end of the inclined plane, formed by the combination of the bottom-board and cover, are placed two rollers, H and I. The roller H is held by the springs a a, and by them is pressed down on the roller I, holding the dough closely against the lower roller. The roller I has a number of fine points or projections on its surface, which catch in the dough as the roller turns, and draw it through between them. This roller has a crown-wheel, K, on one end, which is driven by the pinion L, on the shaft M, fig. 2. The shaft M is driven by the main shaft N, through the medium of the large spur-wheel O, and the disk P, the edge of which is twisted, so as to form one thread of a screw, and operates on one tooth only of the large wheel O, at every revolution of the main shaft N, thereby giving to the roller I a very slow but steady motion, which feeds the dough up to the cutting-knife at a uniform speed.

The knife R is held in the metal frame S, the shape of which is shown in fig. 2. The knife-frame is supported at the upper corner by the swinging-arm T, (which allows the frame to fall down and to the side at the same time,) and by the crank U, by which the knife is driven. The knife fits closely to the steel plate b, and is kept from cutting or striking against it by the guides or guards c c, figs. 1, 2, and 3.

The curved plate d forms the discharge-pipe, the fine strips of vermicelli falling upon it as they are cut, and thence into a suitable receptacle.

All the machinery described is driven by the gearing shown on the outside of the box at W and Y, fig. 1. The balance-wheel X, fig. 3, regulates the motion.

Operation.

The vermicelli is prepared of wheat flour and eggs. The ingredients being mixed into a stiff dough are rolled out very thin, and placed on the inclined table, formed by the bottom-board and the cover of the box. The end of the strip of dough being inserted between the rolls, the machine is put in motion, and the knife, every time it falls, cuts off the narrow strip of dough which projects beyond the plate b. The knife has a side-motion, as well as a downward one, and makes a clean cut every time; and, as the feed-rollers move at a uniform speed corresponding to that of the knife, all the pieces cut are of the same breadth. The strips e e, figs. 1, 2, and 3, form guides, between which the strips of dough are placed. With this machine dough may be cut much more perfectly and in a shorter time than can be done by hand, as is the present practice.

What I claim as my invention, and desire to secure by Letters Patent of the United States, is—

1. The box E, having the inclined bottom G, cover F, and guides e e, when constructed substantially as and used for the purpose specified.

2. The knife-frame S, held in position by the swinging-arm T, and crank U, by which the knife is operated, when the parts are arranged and operated substantially as described.

3. The combination of the knife, supported as described, and of the feed-rollers, operating as described, with the box G, constructed as described, forming a machine used for the purpose set forth.

GOTTL. SCHWARZWALDER.

Witnesses:
FRANCIS L. CLARK,
J. DONALDSON.